United States Patent
Flegg et al.

(10) Patent No.: US 8,117,612 B2
(45) Date of Patent: Feb. 14, 2012

(54) ENTERPRISE DEVICE DRIVER MANAGEMENT FOR OPERATING SYSTEM DEPLOYMENT

(75) Inventors: Brett Flegg, Redmond, WA (US); Ravi Kiran Chintalapudi, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1124 days.

(21) Appl. No.: 11/620,546

(22) Filed: Jan. 5, 2007

(65) Prior Publication Data

US 2008/0168477 A1    Jul. 10, 2008

(51) Int. Cl.
*G06F 9/445* (2006.01)
(52) U.S. Cl. ........ 717/178; 717/171; 717/173; 717/176; 717/177; 719/327
(58) Field of Classification Search .................. 719/327; 717/171, 173, 174, 176, 177, 178
See application file for complete search history.

(56) References Cited

U.S. PATENT DOCUMENTS

| | | | |
|---|---|---|---|
| 5,580,177 A | 12/1996 | Gase et al. | |
| 5,655,148 A | 8/1997 | Richman et al. | |
| 5,748,980 A | 5/1998 | Lipe et al. | |
| 6,032,201 A | 2/2000 | Tillery, Jr. et al. | |
| 6,345,319 B2 | 2/2002 | Lin et al. | |
| 6,714,992 B1 | 3/2004 | Kanojia et al. | |
| 6,813,670 B1 | 11/2004 | Yao et al. | |
| 6,898,653 B2 | 5/2005 | Su et al. | |
| 2002/0194583 A1* | 12/2002 | Kitagawa | 717/173 |
| 2003/0051012 A1* | 3/2003 | Chen | 709/221 |
| 2003/0065773 A1 | 4/2003 | Aiba et al. | |
| 2003/0195951 A1* | 10/2003 | Wittel et al. | 709/220 |
| 2006/0010435 A1* | 1/2006 | Jhanwar et al. | 717/168 |
| 2006/0070089 A1 | 3/2006 | Shoaib et al. | |
| 2006/0080656 A1* | 4/2006 | Cain et al. | 717/174 |
| 2007/0113066 A1* | 5/2007 | Samba et al. | 713/1 |
| 2008/0098094 A1* | 4/2008 | Finkelstein et al. | 709/220 |

OTHER PUBLICATIONS

Dell Power Solutions, "Applying Updates for Dell PowerEdge Servers Using Microsoft Systems Management Server 2003 Part 1" (Aug. 2006). [retrieved from http://www.dell.com/downloads/global/power/ps3q06-20060249-Microsoft.pdf on Jan. 25, 2010] pp. 74-80.*

Microsoft Systems Management Server 2003 Reviewer's Guide (Oct. 2003). [retrieved from http://technet.microsoft.com/en-us/sms/bb676794.aspx on Jan. 25, 2010] pp. 1-56.*

Dell OpenManage Newsletter (Aug. 2006) [retrieved from http://www.dell.com/downloads/global/power/ps3q06-20060307-SysMgmtNews.pdf on Jan. 25, 2010] pp. 1-4.*

Fabrice Meillon BLog's (Archives), http://blogs.msdn.com/fabricem/archive/2005/02/02/365815.aspx [retrieved Jan. 26, 2010].*

Dell Power Solutions, "Automated OS Deployment: Using the Dell OpenManage Deployment Toolkit and Microsoft WinPE", Dell Power Solutions, Feb. 2006, pp. 91-94 [retrieved from http://www.dell.com/downloads/global/power/ps1q06-20050260-Chaganti.pdf on Jun. 21, 2010].*

Microsoft Corporation, "Microsoft Computer Dictionary," 5th edition, 2002, pp. 281.*

(Continued)

*Primary Examiner* — H. S Sough
*Assistant Examiner* — Brian Wathen
(74) *Attorney, Agent, or Firm* — Lee & Hayes, PLLC (57) ABSTRACT

Enterprise driver management and image installation are described. In an implementation, a computer-implemented method is performed in which a determination is made as to whether drivers for a plurality of clients are available from an operating system to be installed on the plurality of clients. A report is then generated describing the availability of the drivers.

20 Claims, 5 Drawing Sheets

OTHER PUBLICATIONS

Araki, et al., "A Non-Stop Updating Technique for Device Driver Programs on the IROS Platform", retrieved at <<http://ieeexplore.ieee.org/iel3/3942/11415/00525144.pdf?isNumber=>>; IEEE, 1995, pp. 88-92.

Swift, et al., "Recovering Device Drivers", available at least as early as <<Nov. 3, 2006>> at <<http://www-users.itlabs.umn.edu/classes/Spring-2005/csci5980-1/papers/recovering-drivers_osdi04.pdf>>, University of Washington, pp. 1-15.

* cited by examiner

ENTERPRISE DEVICE DRIVER MANAGEMENT FOR OPERATING SYSTEM DEPLOYMENT

BACKGROUND

As computers continue to proliferate, ever larger collections of the computers may be configured to provide functionality in a variety of ways. One such configuration is commonly referred to as an "enterprise system", which may include tens of thousands and even hundreds of thousands of computers. The enterprise system, for instance, may be used by corporations to provide computer functionality to its employees, such as through local execution of software and/or remote execution of software through servers. The enterprise system is typically managed by one or more administrators that are tasked with keeping each of the computers functioning as desired.

The enterprise system, however, may include a variety of types of different computers, such as servers, desktop personal computers, laptops, personal digital assistants, "smart" phones, and so on. Further, even the configurations of the computers in these various types may differ as the computers may be made by different manufacturers, such as by including different hardware components (e.g., display devices, processors, memory, printers, network access cards, and other devices) and software components, such as applications and other code that is executed by the computers. Because of this diversity, the maintenance of the computers may be difficult, such as to manage drivers installed on each of the computers and to install disk images (also referred to hereafter as "images") because of the diversity of drivers.

SUMMARY

Operating system deployment is described. In an implementation, a computer-implemented method is performed in which a determination is made as to whether drivers for a plurality of clients are available in an operating system image to be installed on the plurality of clients. A report is then generated describing the availability of the drivers.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Enterprise systems may include a vast multitude of computers, even numbering in the hundreds of thousands. Management of these computers by an administrator, however, may be difficult due to this vast number as well as the diverse configurations of computers that may be employed within the enterprise system.

Deployment of an operating system (either from a disk image know as an image-based install or original sources media) in the enterprise system, for example, may be difficult because the system may include a variety of different computer models. Additionally, these different computer models may originate from different manufactures that may each use different sets of drivers to "talk" to devices included with the computers. Previously, the administrator was forced to manually interact with these different devices to determine and supply the different device drivers used to support the image, which was resource intensive and therefore expensive.

Techniques are described, in which, driver compatibility reports may be automatically generated in an enterprise environment. This report may be generated in a variety of ways, such as through the capture of "plug-and-play" information from devices included with a client, such as monitors, removable media devices, input devices (e.g., keyboards, mice), printers, and so on. The report may then be used by the administrator to "pre-plan" for a deployment of an image, such as an operating system image to be installed on computers of the enterprise system. The report may be configured in a variety of ways, such as to list missing or out-of-date drivers, and may also list "where" the drivers may be found, such as in the image to be deployed, in a driver repository located within the enterprise system, in a driver update service that is accessible "in the cloud" (i.e., the Internet), and so on. Further discussion of these techniques may be found in relation to the following figures.

In the following discussion, an exemplary environment is first described that is operable to perform techniques to manage drivers and/or install images in an enterprise system, as well as other systems. Exemplary procedures are then described that may be employed in the exemplary environment, as well as in other environments.

Exemplary Environment

Figure 1:
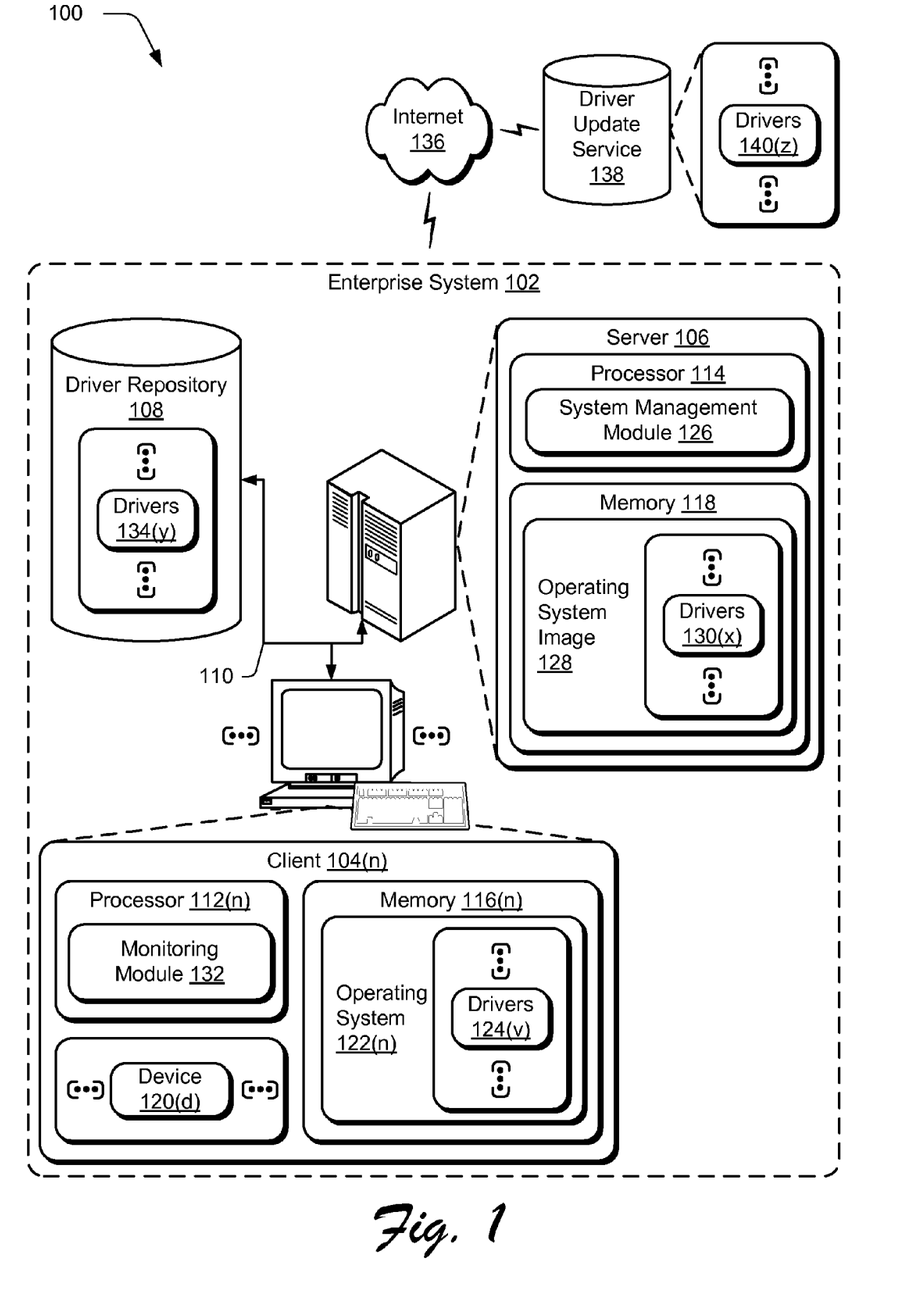
FIG. 1 is an illustration of an environment in an exemplary implementation that is operable to employ operating system deployment techniques in an enterprise system.

FIG. 1 is an illustration of an environment 100 in an exemplary implementation that is operable to employ driver management and image installation techniques. The illustrated environment 100 includes an enterprise system 102 having one or more client devices 104(n) (where "n" can be any integer from one to "N"), a server 106 and a driver repository 108 that are communicatively coupled, one to another, via an enterprise network 110, e.g., a local area network (LAN), a wireless network, an intranet, and so on. Although a single server is shown 106, the server 106 may be representative of a plurality of servers, such as a server farm. Further, in the following discussion, the client 104(n) may be representative of one or more entities, and therefore reference may be made to a single entity (e.g., the client 104(n)) or multiple entities (e.g., the clients 104(n), the plurality of clients 104(n), and so on). Additionally, although an enterprise system 102 is shown, a variety of groups and arrangements of computers are also contemplated without departing from the spirit and scope of the present discussion.

The client 104(n) and the server 106 are each illustrated as having respective processors 112(n), 114 and memory 116(n), 118. Processors are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. Alternatively, the mechanisms of or for processors, and thus of or for a computing device, may include, but are not limited to, quantum computing, optical computing, mechanical computing (e.g., using nanotechnology), and so forth. Additionally, although a single memory 116(n), 118 is shown, respectively, for the client 104(n) and the server 106, a wide variety of types and combinations of memory may be employed, such as random access memory (RAM), hard disk memory, removable medium memory, and other types of computer-readable media.

The clients 104(n) may be configured in a variety of ways to be incorporated within the enterprise system 102, as well as other systems. For example, one or more of the clients 104(n) may be configured as a computing device, such as a desktop computer, a mobile station, an entertainment appliance, a set-top box communicatively coupled to a display device, a wireless phone, a game console, and so forth. Thus, the clients 104(n) may range from full resource devices with substantial memory and processor resources (e.g., personal computers, game consoles) to low-resource devices with limited memory and/or processing resources (e.g., traditional set-top boxes, hand-held game consoles). Thus, each of the client devices 104(n) may incorporate a variety of devices 120(d) (where "d" can be any integer from one to "D") to provide functionality to the client 104(n), such as output devices (e.g., monitors, printers), input devices (e.g., keyboards, mice, pointers), storage devices (e.g., removable media devices, disk drives), peripherals, and so on.

The client 104(n), for instance, may include an operating system 122(n), which is illustrated as being stored in memory 116(n) and is executable on the processor 112(n). The operating system 122(n) may act as a layer to "abstract" the underlying functionality of the client 104(n) to applications that are executed on the processor 112(n). For example, the operating system 122(n) may employ drivers 124(v) (where "v" can be any integer from one to "V") to enable these devices 120(d) to interact with the client 104(n), such as applications executed on the processor 112(n) of the client 104(n), through interaction with the operating system 122(n). However, as previously described the client 104(n) may include a wide variety of devices 120(d) and be configured in a variety of ways, and therefore each of the clients 104(n) may include different drivers 124(v). The use of different drivers 124(v) by different clients 104(n), however, may complicate management of the clients 104(n) in an enterprise system 102, especially with increasing numbers of clients 104(n).

An administrator, for instance, may interact with a system management module 126 that is executed on a processor 114 of the server (and is storable in memory 118) to manage the clients 104(n) in the enterprise system 102. The system management module 126 may be executed to provide a variety of functionality. For example, the administrator may wish to install a disk image on one or more of the clients 104(n) in the enterprise system 102, such as an operating system image 128 having a plurality of drivers 130(x) (where "x" can be any integer from two to "X"). Before deployment of the operating system image 128, however, the administrator may wish to "pre-plan" the installation to minimize "downtime" of the clients 104(n) and corresponding interruptions to users of the clients 104(n).

In an implementation, the system management module 126 is executed to generate reports indicating which devices 120(d) are employed by the clients 104(n) and what drivers correspond to those devices 120(d) such that the operating system image 128 may be successfully deployed. The system management module 126, for instance, may provide a monitoring module 132 that is executed locally on each of the clients 104(n). The monitoring module 132 may provide information regarding the devices 120(d) and/or software included on the client 104(n) to the server 106. This information may be collected in a variety of ways, further discussion of which may be found in relation to FIG. 2.

The system management module 126 may then use this information to generate a report detailing the devices 120(d) included in the clients 104(n) and drivers used to support these devices when the operating system image 128 is deployed to the client 104(n) that correspond to those devices 120(d). After this determination, the system management module 126 may then ascertain as to whether those drivers are included in the drivers 130(d) within the operating system image 128 to be installed. In an implementation, the system management module 126 may also locate drivers that are not included in the operating system image 128, such as from a driver repository 108 within the enterprise system 102 that includes a plurality of drivers 134(y) (where "y" can be any integer from two to "Y") or over the Internet 136 in a driver update service 138 that also contains a plurality of drivers 140(z) (where "z" can be any integer from two to "Z"). Thus, the Administrator may be informed as to which drivers are to be used by the clients 104(n), but also where those drivers may be found. Further discussion of report generation may be found in relation to FIGS. 3 and 4.

The system management module 126 may also be used to manage the drivers 124(v) of the clients 104(n) in the enterprise system 102 in a variety of other instances. For instance, the system management module 126 may generate the report to determine whether updates to the drivers 124(v) are warranted, and if so, automatically obtain the drivers without user intervention, such as from the driver repository 108 and/or from the driver update service 138 over the internet 136. Further discussion of driver updates may be found in relation to FIG. 5.

Generally, any of the functions described herein can be implemented using software, firmware, hardware (e.g., fixed logic circuitry), manual processing, or a combination of these implementations. The terms "module," "functionality," and "logic" as used herein generally represent software, firmware, hardware, or a combination thereof. In the case of a software implementation, for instance, the module, functionality, or logic represents program code that performs specified tasks when executed on a processor (e.g., CPU or CPUs). The program code can be stored in one or more computer readable memory devices, e.g., memory 116(n), 118. The features of the techniques to manage driver and install images described below are platform-independent, meaning that the techniques may be implemented on a variety of commercial computing platforms having a variety of processors.

Exemplary Procedures

The following discussion describes management and installation techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1.

Figure 2:
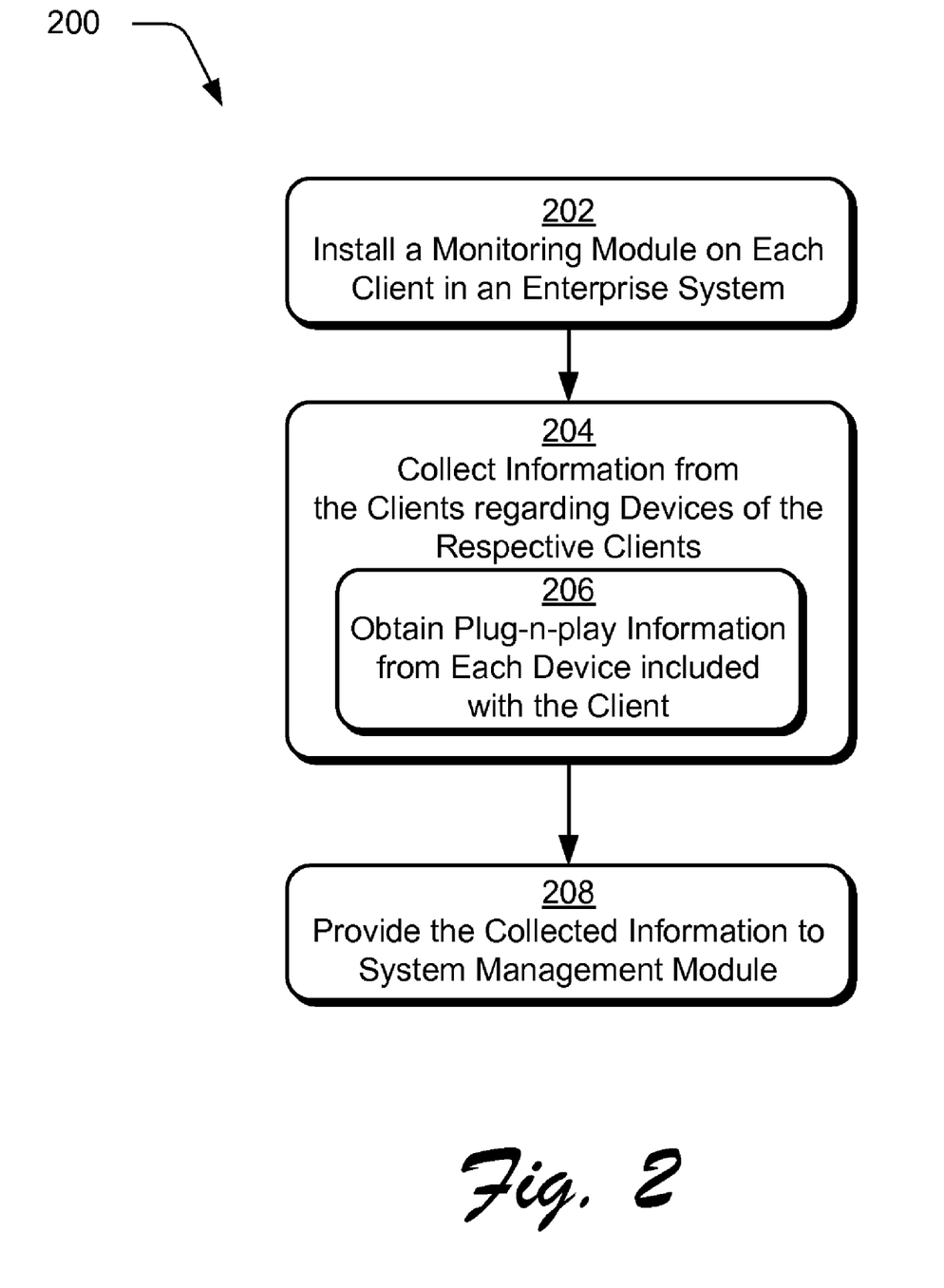
FIG. 2 is a flow diagram depicting a procedure in an exemplary implementation in which a monitoring module is installed on clients of an enterprise system to collect device information from the clients.

FIG. 2 depicts a procedure 200 in an exemplary implementation in which a monitoring module is installed on clients of an enterprise system to collect device information from the clients. A monitoring module is installed on each client in an enterprise system (block 202), such as through execution of the system management module 126 to provide the modules over the enterprise network 110, through manual installation by an administrator that physically interacts with each of the clients 104(*n*), and so on.

Information is collected from the clients regarding devices of the respective clients (block 204). For example, the monitoring module 132 may query "plug-and-play" devices 120(*d*) of the client 104(*n*) (block 206). "Plug-and-play" devices are typically configured to "talk" to the client 104(*n*), and more particularly an operating system and Basic Input/Output System (BIOS) of the client 104(*n*), to arrive an a configuration that enables the device 120(*d*) and the client 104(*n*) to work together, such as through use of a device driver. A device driver is software that abstracts the functionality of a physical or virtual device. A device driver manages the operation of these devices and makes them available to the operating system and programs. Examples of physical devices are network adapters, timers, and universal asynchronous receiver-transmitters (UARTs). A variety of information may be collected, such as a "client GUID" which is a unique identifier for a particular client assigned at the time the monitoring module 132 was installed, a device ID which is a unique id of a device instance on a given client, a device name, device description, device hardware ids and compatibles ids taken from plug-and-play information, and so on. Thus, the information may be collected from the devices 120(*d*) themselves which may be used to determine a configuration that enables operation with the client 104(*n*). This query may be performed in real time, at preconfigured intervals, and so on. A variety of other examples are also contemplated, such as through remote monitoring through execution of the system management module 126.

The collected information is then provided to the system management module (block 208). Continuing with the previous examples, the monitoring module 132 may store the information locally on the client 104(*n*) and provide this information at predetermined intervals, may provide the information when a change is detected, and so on. In another one of the previous examples, the system management module 126 may scan the client 104(*n*) at predetermined intervals, in real time, and so on. A variety of other examples are also contemplated. This information may then be used to generate a report, further discussion of which may be found in relation to the following figure.

Figure 3:
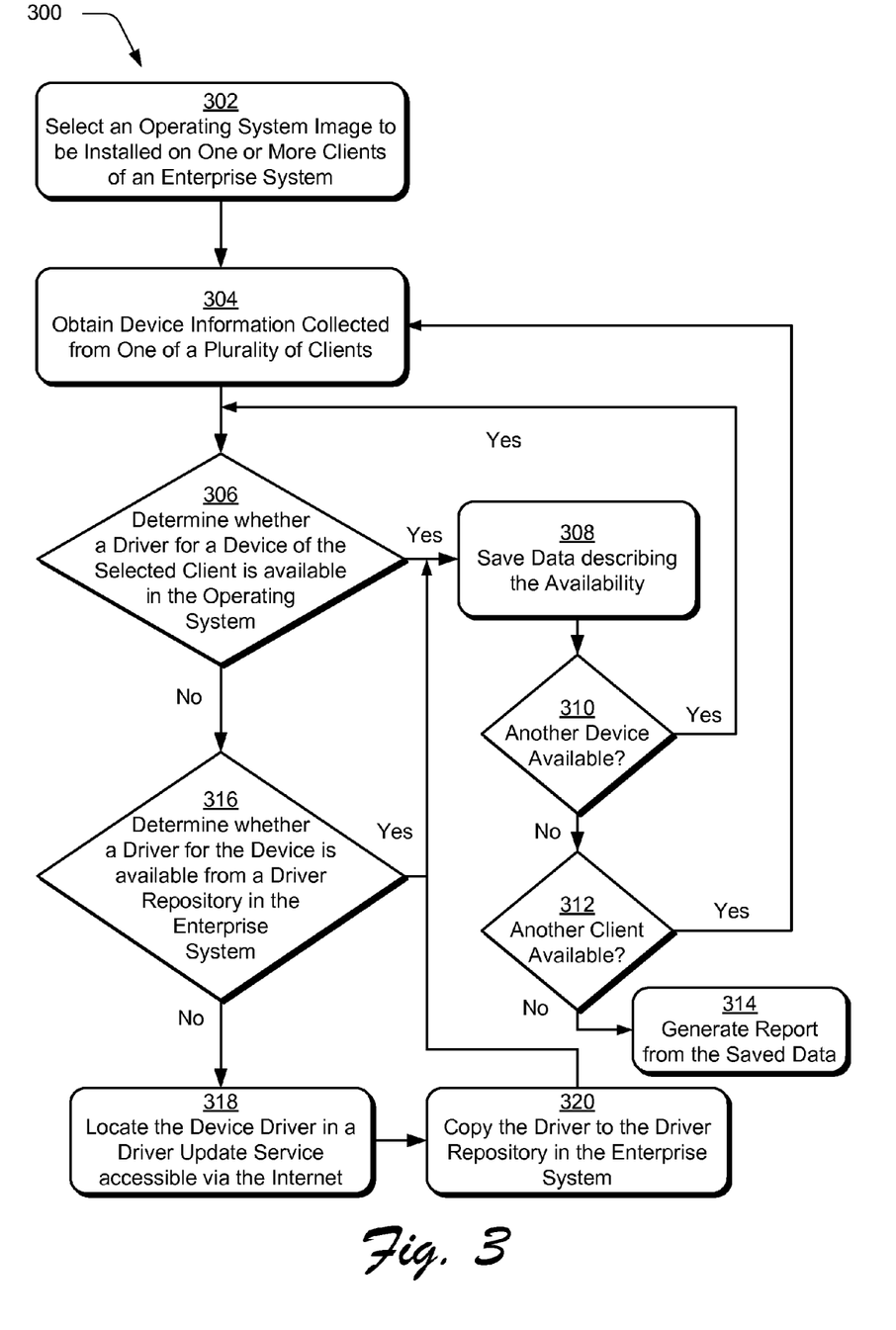
FIG. 3 is a flow diagram depicting a procedure in an exemplary implementation in which a report is generated that describes devices, drivers to be used with the devices and where the drivers may be located.

FIG. 3 depicts a procedure 300 in an exemplary implementation in which a report is generated that describes devices, drivers to be used with the devices and where the drivers may be located. An image is selected to be installed on one or more clients of an enterprise system (block 302). An administrator of an enterprise system 102, for instance, may select an operating system image 128 to be installed on a subset of the clients 104(*n*) in the enterprise system 102.

Device information is obtained that was collected from one of a plurality of clients (block 304) in the enterprise system 102. The information, for instance, may be provided according to the procedure 200 of FIG. 2.

A determination is made as to whether a driver for device of the selected client is available in the image (block 306). This determination may be made in a variety of ways. For example, the operating system image 128 to be installed may include a built-in driver store that provides an application programming interface to list each of the drivers in the image. In another example, a list may be formed through a search of drivers that are included in the image. This list may be generated in a variety of ways. For instance, a search may be performed by the system management module 126 through to image to determine which drivers are included in the image 128. In another instance, the list may be generated on demand to ensure that the information is up-to-date. In yet another instance, the list of drivers contained within the image 128 may be generated when the image is imported or is updated. This list may then be stored in a database and queried when the report is viewed. In a further instance, a static list of drivers may be maintained within the operating system image 128 and included when it is shipped. A variety of other instances are also contemplated.

When the driver is available from the image ("yes" from decision block 306), data describing the availability is saved (block 308), such as to indicate "which" driver and "where" it is located, i.e., the image. In an implementation, a driver version and publication date may also be read even if the driver is included in the image, such that a more recent driver may be located, such as through the driver update service or driver repository.

A determination is then made as to whether another device is available in the client (decision block 310). If so ("yes" from decision block 310), the procedure 300 returns to determine whether a driver for the device of the selected client is available in the image (decision block 306). If another device is not available ("no" from decision block 310), then a determination is made as to whether another client is available (decision block 312). If so ("yes" from decision block 312), device information is obtained form information collected from one of the plurality of clients (block 304), i.e., another client is selected and the devices information for the selected client is obtained. When another client is not available ("no" from decision block 312), a report is generated from the saved data (block 314), further discussion of which may be found in relation to FIG. 4.

When the driver is not available from the image ("no" from decision block 306), a determination is made as to whether a driver for the device is available from a driver repository in the enterprise system (decision block 316). The driver repository 108, for instance, may be used by the administrator to maintain drivers within the enterprise system 102 that have been identified as corresponding to devices used by clients within the enterprise system 102. As previously described, this determination may be performed regardless of whether the driver is located in the image, such as to locate an "updated" driver.

When the driver is available from the driver repository ("yes" from decision block 316), data describing the availability is saved (block 308) and determinations are made as to whether additional devices and/or drivers are available as previously described (blocks 310-314).

When the driver is not available from the driver repository ("no" from decision block 316), an attempt is made to locate the device driver in a driver update service that is accessible via the Internet (block 318) to the enterprise system 102. The system management module 126, for instance, may query the driver update service 138 which may contain a global list of drivers that may be queried and downloaded. For example, once a driver is located, the driver may be copied to the driver repository in the enterprise system (block 320) such that it is available during deployment of the operating system image 128. The driver update service 138, for instance, may be included as part of an update service that maintains a list of certified devices driver, such as for patching purposes.

The driver update service 138, for instance, may be used for devices that do not have a local match within the enterprise system 102, such as within the operating system image 128 or the driver repository 108. A request to the driver update service 138 may include hardware/compatible IDs of the plug-and-play devices to be matched, version/architecture of the operating system image 128, and so on. The update service may then search for matching drivers and return the location of compatible drivers. The compatible drivers may then be downloaded and automatically imported for use during deployment of the operating system. This mechanism may also be used to locate and provide updated drivers for the enterprise system 102, further discussion of which may be found in relation to FIG. 5.

Thus, to generate a report, the administrator may select a collection of clients and select an image to be deployed to those clients. The system management module 126 may then query device inventory information for the selected clients and generate a list of unique devices. This list, along with the target image version (e.g., operating system version) and architecture may be used in a driver matching procedure which determines if there are compatible drivers for each device, which may then be output as a report.

Figure 4:
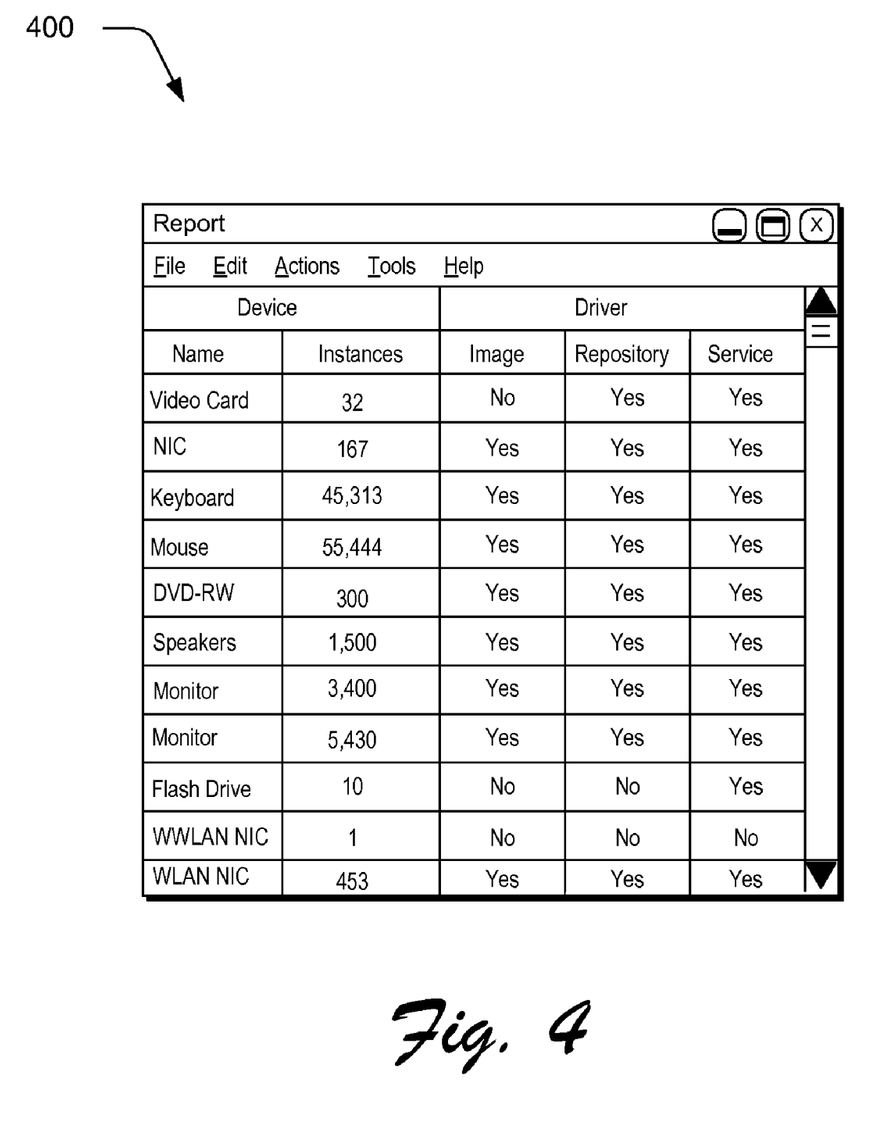
FIG. 4 is an illustration of an exemplary report generated according to the procedure of FIG. 3.

FIG. 4 illustrates an exemplary report generated via the procedure 300 of FIG. 3. The report 400 includes names of devices 120(d) of the enterprise system 102 and corresponding instances of the device 120(d) within the enterprise system 102. For each device, an indication is provided as to where the drive for the device may be located, if at all. For example, the driver for the keyboard may be found in the operating system image 128, the driver repository 108 and the driver update service 138. The driver for the flash drive, however, may not be found in the image 128 or the driver repository 108 but may be found in the driver update service 138. The report 400 may also flag "missing" drivers that may not be found in the queried locations, and therefore call the administrator's attention to that device to use other techniques to obtain the missing driver.

The report 400 may be rendered in hypertext markup language (HTML) and may provide an option for the administrator to "drill-down" to obtain more information. For example, the administrator may select (e.g., "click") an entry in the instances column to cause a list of devices to be output that have the corresponding device. The administrator may also select an entry in the driver update service column to be taken to a report that lists compatible drivers for the given device. A variety of other examples are also contemplated.

Although the report 400 of FIG. 4 is illustrated as indicating whether the driver is available from the image 128, the repository 108 or the update service 138, a variety of configurations are contemplated. For example, the report 400 may indicate whether the driver is available within the enterprise system 102 via the image 128 or the repository 108 and provide the option to the administrator to determine whether the driver is available from the service 138. As before, a variety of other examples are also contemplated.

Figure 5:
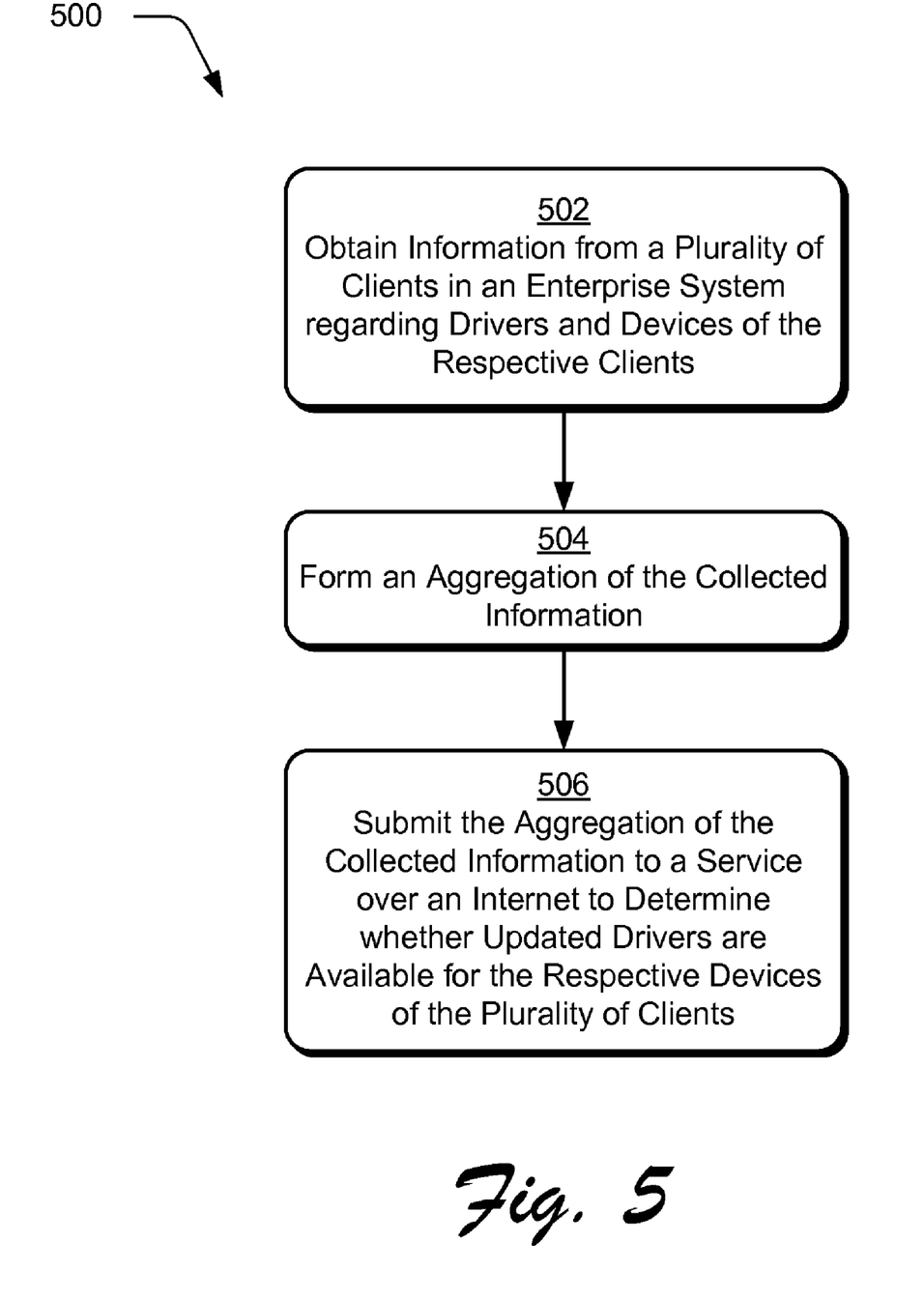
FIG. 5 is a flow diagram depicting a procedure in an exemplary implementation in which information is aggregated from devices of an enterprise system and submitted to an update service to locate updated drivers for devices within the enterprise system.

FIG. 5 depicts a procedure 500 in an exemplary implementation in which information is aggregated from devices of an enterprise system 102 and submitted to an update service to locate updated drivers for devices 120(d) within the enterprise system 102. Information is obtained form a plurality of clients in an enterprise system regarding drivers and devices of the respective clients (block 502). The information, for instance, may be obtained as described in relation to the previous figures.

An aggregation of the collected information is formed (block 504). For example, a single listing may be formed for each combination of device and current driver being used for the device. The aggregation of the collected information may then be submitted to a service over an internet to determine whether updated drivers are available for the respective devices of the plurality of clients (block 506). In this way, a single request may be provided for the clients 104(n) in the enterprise system 102 without having to submit separate request by each of the clients 104(n), thus conserving resources of the enterprise system 102. A response to the request may then be received which indicates locations of updated drivers which may then be installed. In an implementation, the response may include the updated drivers.

The determination of whether a driver is compatible with a given device may be performed in a variety of ways. Each device, for instance, may have an ordered set of a vendor-defined identification strings (called hardware IDs and compatible IDs) that indicate the set of interfaces that it supports. Each device driver may also have a similar set of identification strings (also called hardware IDs and compatible IDs) contained in an INF file for each operating system version and architecture that it supports. On a given operating system, a device driver is considered compatible with a device if they have one of these identification strings in common.

There are a number of other things that can determine if a driver will actually be used for a specific device. For example, a driver may also have some machine code that is executed at install time that performs custom checks to determine if it is compatible. Also, an operating system may employ "driver signing" that can allow an enterprise administrator to only allow drivers that have been verified by a creator of the operating system to be installed on a machine.

Driver categories may also be employed, which are administrator defined groups of drivers that can be used to control the drive matching process. For example, the administrator may decide to classify some drivers as "beta drivers" and not allow them to be considered when performing driver matches because they have not yet passed all internal tests. A variety of other examples are also contemplated.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A computer-readable storage media having instructions stored thereon that, when executed by a processor, perform a computer-implemented method comprising:

obtaining information from a plurality of clients of an enterprise system regarding devices and types of the devices of the plurality of clients;

determining which drivers for the devices of the plurality of clients are available in an operating system to be installed on the plurality of clients;

determining which drivers for the devices of the plurality of clients are missing in the operating system to be installed on the plurality of clients;

determining, based on whether one or more drivers for devices are missing in the operating system, whether the one or more drivers for devices that are missing in the operating system are available in a driver repository of the enterprise system;

determining, based on whether one or more missing drivers for devices are unavailable in the driver repository, whether the one or more missing drivers are available in a driver update service accessible by the enterprise system over an Internet by querying the driver update service; and generating a report describing locations of the drivers that are available.

2. A computer-readable storage media as described in claim 1, wherein the report indicates the devices and the locations of the drivers associated with the devices, the locations comprising:
the operating system;
the driver repository; and
the driver update service.

3. A computer-readable storage media as described in claim 1, wherein the determining includes examining information obtained from a plug-and-play query response of one or more devices of the plurality of clients.

4. A computer-readable storage media as described in claim 1, wherein the information is obtained by monitoring the plurality of clients remotely over a network.

5. A computer-readable storage media as described in claim 1, wherein the information is obtained from a monitoring module that is executed locally on one or more of the plurality of clients.

6. A computer-readable storage media as described in claim 1, further comprising determining whether updates for those drivers that are available in the operating system to be installed on the plurality of clients are available in the driver repository of the enterprise system or the driver update service.

7. A computer-readable storage media as described in claim 1, wherein when a particular driver is available in the driver update service but not in the operating system further comprising copying the particular driver to the driver repository of the enterprise system.

8. A computer-readable storage media as described in claim 1, wherein the generating of the report is performed to describe whether each driver is available from the operating system, the driver repository or the driver update service.

9. A computer-readable storage media having instructions stored thereon that, when executed by a processor, perform a computer-implemented method comprising:
obtaining information from a plurality of clients in an enterprise system regarding devices of respective clients of the plurality of clients;
determining drivers that are associated with the devices;
determining which drivers for the devices of the respective clients are available in an operating system to be installed on the respective clients;
determining which drivers for the devices of the respective clients are missing in the operating system to be installed on the respective clients;
determining, based on whether one or more drivers for devices are missing in the operating system, whether the one or more drivers for devices that are missing in the operating system are available in a driver repository of the enterprise system;
determining, based on whether one or more missing drivers for devices are not available in the driver repository, whether the one or more missing drivers for devices that are not available in the driver repository are available in a driver update service accessible by the enterprise system over an Internet by querying the driver update service; and,
generating a report of available drivers indicating locations of the available drivers associated with the devices, the locations comprising the operating system, the driver repository and the driver update service.

10. A computer-readable storage media as described in claim 9, wherein at least part of the information is obtained from a plug-and-play query response of the devices of the respective clients.

11. A computer-readable storage media as described in claim 10, wherein the information is obtained from a monitoring module that is executed locally on one or more of the respective clients to collect the information.

12. A computer-readable storage media as described in claim 11, wherein the information is obtained at predetermined intervals.

13. A computer-readable storage media as described in claim 12, wherein the information is obtained in real time.

14. One or more computer-readable storage media having executable instructions that, when executed, direct a computer to generate a report from information collected from clients in an enterprise system regarding respective devices included in the clients, wherein the report describes availability of drivers for the respective devices, the availability being based on:
determining a first subset of the drivers that are available in an image of an operating system to be installed on the clients;
determining a second subset of the drivers that are missing in the image of the operating system but are available in a driver repository included in the enterprise system; and
determining a third subset of the drivers that are missing in the image of the operating system and are not available in the driver repository but are available in a driver update service accessible by the enterprise system over an Internet by querying the driver update service.

15. One or more computer-readable storage media as described in claim 14, wherein at least a subset of the information is obtained from a plug-and-play query response of at least a subset of the respective devices of the clients.

16. One or more computer-readable storage media as described in claim 14, wherein the report indicates whether the drivers are available in the image of an operating system to be installed on the clients.

17. One or more computer-readable storage media as described in claim 14, wherein the report indicates whether the drivers are available in the driver repository included in the enterprise system.

18. One or more computer-readable storage media as described in claim 14, wherein the report indicates whether the drivers are available in the driver update service accessible to the enterprise system over the Internet.

19. One or more computer-readable storage media as described in claim 14, wherein the report indicates that at least one said client does not have a driver installed for a respective said device.

20. One or more computer-readable storage media as described in claim 14, the report indicating the devices and locations of available drivers associated with the devices, the locations comprising the operating system, the driver repository and the driver update service.

* * * * *